July 26, 1955  E. F. CHASE  2,713,862
COOKING UTENSIL GROUPING APPARATUS
Filed Sept. 19, 1950
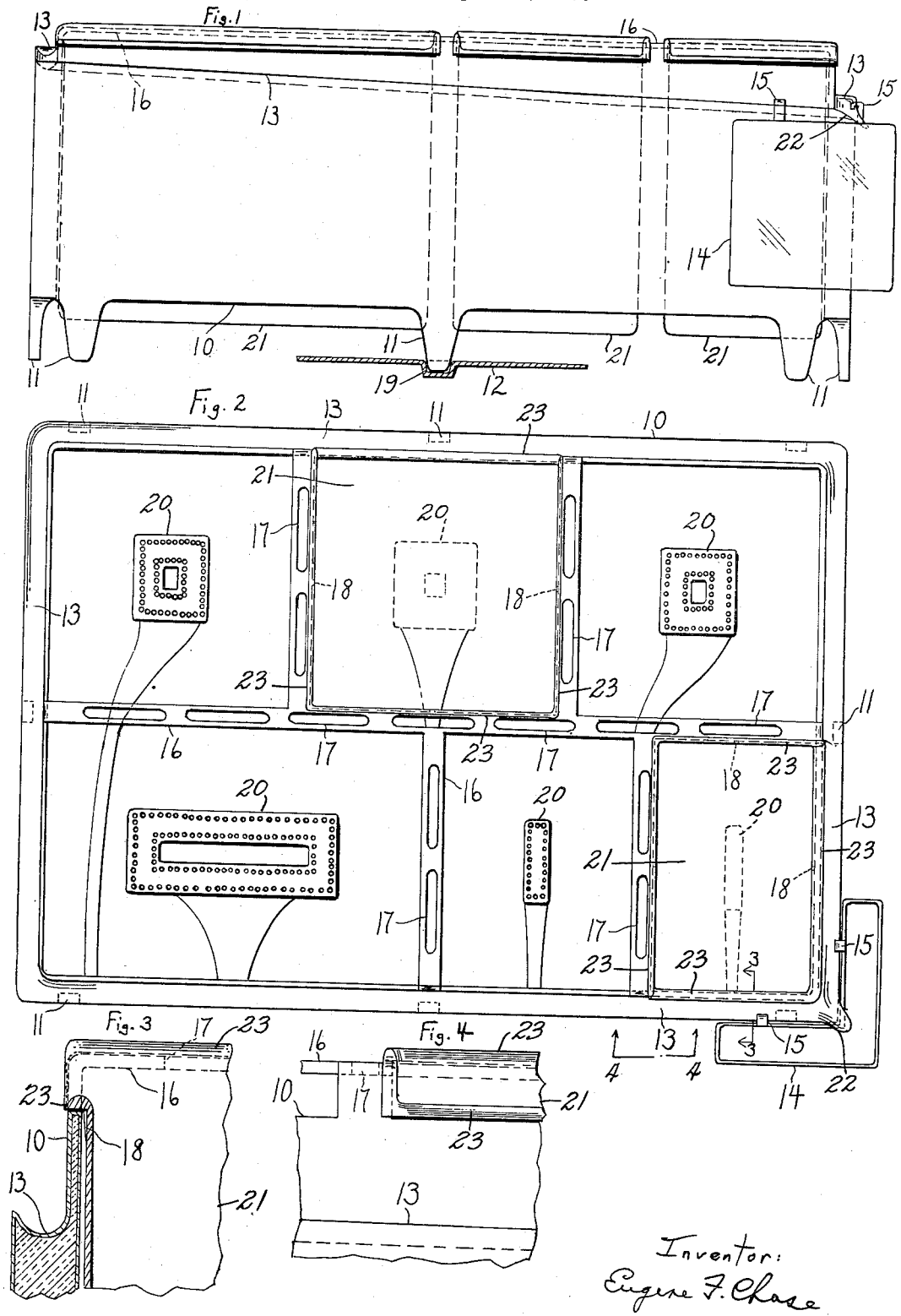
Inventor:
Eugene F. Chase 2,713,862
Patented July 26, 1955

2,713,862

COOKING UTENSIL GROUPING APPARATUS

Eugene Francis Chase, San Francisco, Calif.

Application September 19, 1950, Serial No. 185,649

6 Claims. (Cl. 126—215)

The purpose of my invention is to provide a new type of top-of-stove cooking apparatus. There are several advantages of this invention compared to the various modes of top-of-stove cooking used so far. In the first place, I use utensils which are rectangular in shape, thus allowing for much more efficient use of the available space on the top of the stove. Secondly, this invention provides for close grouping of the utensils which of course uses space very efficiently, and also allows heat from a heating unit under one utensil to heat adjacent utensils to some degree merely by radiation or convection which would not be sufficient to damage said adjacent utensils nor burn their contents, yet would be sufficient to warm said contents. It will be seen from the drawings that the rectangular utensils are maintained in substantially side by side relationship so that a side of one is closely adjacent to and substantially parallel to a side of another utensil, with the mutually adjacent sides being parallel the horizontal distance they are in juxtaposition.

Thirdly, by having a jacket member surrounding the utensils, said jacket member being insulated on all four sides, waste of heat energy is minimized and cooking, particularly in hot weather, would be made much more comfortable as horizontal radiation or convection of heat would be practically eliminated. Another advantage is the fact that all spillovers would be taken care of by the trough built into the exterior of the jacket and the receptacle into which all spillovers are directed by the trough.

Another advantage would be the elimination of the necessity of top burner grates, burner trays and drip trays; the utensils are supported by outwardly projecting lips at their tops, which lips rest on the insulated jacket member and the framework attached thereto, and the jacket member is supported by the main top of the stove; spillovers are taken care of, as said above, by the trough and the receptacle connected therewith, thereby eliminating the need for any sort of pans or trays to take care of drippings or spillovers. In addition, the depth of the utensils would eliminate much of the splattering incident to the use of shallower utensils.

The entire apparatus, the insulated jacket member and the utensils, could be recessed into an appropriately sized well in the stove in the bottom of which the heating units could be mounted, but in view of the necessity of air for combustion purposes in the case of a flame type stove, and the desirability, in many cases, of an elevated separate broiler or two ovens, the top of stove mounting will be probably more universal. Of course, provision could be made for these necessities and desirable features. Also, the insulated jacket member could be rigidly or permanently attached to the stove as by being made an integral part thereof.

Still another advantage of this invention is that in combination with the rectangular utensils, heating units for the utensils are also rectangular and similar in size and shape to the bottoms of the utensils thus making for greater efficiency as far as utilization of heat energy is concerned; the way the apparatus is built, the same utensil will always be over the same heating unit.

Another advantage is, in the case of a gas stove, due to the close grouping of the burners one pilot would suffice for all of the six burners shown in Fig. 2 of the drawings.

Referring to the drawings, Fig. 1 is a front view of the apparatus showing the three front utensils and the spillover receptacle in place. Fig. 2 is a top view of the apparatus showing the varying sizes and shapes of the heating units 20 (gas burners being shown) with the right front and middle rear utensils in place. Fig. 3 is a view taken on the line 3—3 of Fig. 2. Fig. 4 is a view taken on the line 4—4 of Fig. 2.

Referring to Fig. 1, 10 is the insulated jacket member which completely surrounds the utensils 21, parts marked 11 are the legs which are an integral part of the jacket member and which rest in recesses in the main top 12 of the stove. An example of such a recess 19 is shown in section in Fig. 1. The legs are as shown in the case of a flame type stove, permitting primary and secondary air to get to the burners; in the case of an electric stove the legs would be shorter so that the bottoms of the utensils would be in contact with the heating units in which case the lips 23 at the tops of the utensils would overlie, but not necessarily rest upon, the insulated jacket member and the framework attached thereto. The trough 13 is sloped in both directions from the left rear corner so as to direct all spillovers to the receptacle 14 at the right front corner through the discharge opening 22 formed in said trough at the said right front corner; the receptacle 14 is supported in position by two hooks 15 fabricated onto the receptacle 14, said hooks hooking onto the trough 13.

The framework 16, which is fabricated onto the top of the insulated jacket 10 and extends upwardly therefrom and between the four walls thereof, has apertures 17 throughout its entire length to allow for escape of heat and products of combustion. This framework also serves, along with the top of the jacket, to support the utensils 21, extending between said utensils; the said framework and the said top of the jacket supporting said utensils by engagement with the underside of outwardly extending peripheral lips 23 provided at the top edges of the said utensils 21. It will be noted from the drawings that the contour of the top edge of each utensil 21, and thus of the said lip 23, is uneven, that is, the part of said lip which rests on the framework 16 is higher than the part which rests on the top of the jacket 10; this construction forces all boilovers and spillovers to the exterior of the jacket 10 and into the trough 13.

In Fig. 3 is shown a sample of the ears 18 of which there is one on the exterior of the middle of each of the four sides of each utensil; these ears serve to center the utensil over the heating unit 20 and also to keep the utensil away from the jacket 10 a proper distance.

All the corners of the utensils are rounded to make for ease of cleaning.

Obviously, this cooking apparatus can be used with any type of fuel or electricity.

Enclosing lids, the contours of the bottoms of which would conform to the contours of the tops of the utensils, could be used where desired; such lids could be insulated if desired.

Suitable handles could be fabricated onto each utensil, or a separate handle could be furnished which would be engageable with any of the utensils.

Of course, the number of utensils, and accordingly, the number of heating units, could vary on different models of stoves; also, the sizes and shapes of the several utensils, and accordingly, the sizes and shapes of the top heating units, could vary in observance of varying needs or desires.

In the following claims, when I use the term "top heating units," I mean the heating units ordinarily used for frying, boiling, stewing and other usual top-of-stove cooking operations; when I use the word "surrounding," I mean inclosing on all sides.

While I have shown but one embodiment of my invention it is to be understood that it is to be taken as illustrative only and not in a limiting sense. Changes in details of construction and in the combination and arrangement of parts may be availed of within the spirit and scope of the invention as defined in the hereunto appended claims.

I claim:

1. In a top of stove cooking apparatus, a plurality of cooking utensils, a jacket member substantially surrounding said plurality of utensils, a framework extending upwardly from and between the walls of said member substantially at the upper edges thereof, said framework extending between said utensils, each of said utensils being so constructed that the contour of the top edge of each is uneven so that a part of said top edge is at a lower level than the balance of the said top edge when said utensil is in operative position, an outwardly extending lip on each of said utensils at the said lower level of the said top edge thereof, said lip being adapted to overlie the top edge of said member when said utensil is in said operative position, the balance of the said top edge of each of said utensils being at a higher level relative to said lip so as to thereby force all boilovers and spillovers over said lip to the exterior wall of said member, a trough on said exterior wall of said member, said trough being adapted to receive said boilovers and spillovers, an outwardly extending lip on each of said utensils at the said top edge which is at said higher level, said lip at said higher level being adapted to rest on said framework when said utensil is in said operative position.

2. In a top of stove cooking apparatus, a plurality of cooking utensils, said utensils varying in size and shape, a jacket member substantially surrounding said plurality of utensils, in combination with an equal number of top heating units, each of said units being so constructed so as to be similar in size and shape to the bottom of one of said utensils, a framework extending between the walls of said member, said framework forming openings in such manner that as said utensils are placed in operative position each utensil is thereby placed over a unit of a size and shape similar to that of the bottom of the utensil, each of said utensils being so constructed that the contour of the top edge of each is uneven so that a part of the said top edge is at a lower level than the balance of the said top edge when said utensil is in operative position, an outwardly extending lip on each of said utensils at the said lower level of the said top edge thereof, said lip being adapted to overlie the edge of said member when said utensil is in said operative position, the balance of the said top edge of each of said utensils being at a higher level relative to said lip so as to thereby force all boilovers and spillovers over said lip to the exterior wall of said member, a trough on said exterior wall of said member, said trough being adapted to receive said boilovers and spillovers.

3. In a top of stove cooking apparatus, a plurality of cooking utensils, each of said utensils being substantially rectangular in horizontal cross section, at least two of said utensils varying in size in at least one horizontal dimension, a jacket member substantially surrounding said plurality of utensils, said utensils being adapted to be supported in substantially side by side relationship when in operative position so that a side of one is closely adjacent to a side of another, said mutually adjacent sides being substantially parallel the horizontal distance they are in juxtaposition, in combination with an equal number of top heating units, said units being substantially rectangular in horizontal cross section, each of said units being so constructed so as to be similar in size and shape to the bottom of one of said utensils, a framework extending between the walls of said member, said framework forming openings in such manner that as said utensils are placed in said operative position each utensil is thereby placed over a unit of a size and shape similar to that of the bottom of the utensil, each of said utensils being so constructed that the contour of the top edge of each is uneven so that a part of the said top edge is at a lower level than the balance of the said top edge when said utensil is in said operative position, an outwardly extending lip on each of said utensils at the said top edge which is at said lower level, the balance of the said top edge being at a higher level when said utensil is in said operative position so as to thereby force all boilovers and spillovers over said lip, means to receive said boilovers and spillovers when they are so forced over said lip.

4. A cooking apparatus of the character described in claim 3 wherein the said means is carried by said jacket member.

5. A cooking apparatus of the character described in claim 4 wherein the said lip on each of said utensils is adapted to overlie the top edge of said jacket member when said utensil is in said operative position so as to thereby force all boilovers and spillovers to the exterior wall of said member, a trough on said exterior wall of said member, said trough being adapted to receive said boilovers and spillovers.

6. In a top of stove cooking apparatus, a plurality of cooking utensils, each of said utensils being substantially angular in horizontal cross section, a jacket member substantially surrounding said plurality of utensils, said utensils being adapted to be supported in substantially side by side relationship when in operative position so that a side of one is closely adjacent to a side of another, said mutually adjacent sides being substantially parallel the horizontal distance they are in juxtaposition, in combination with an equal number of top heating units, said units being substantially angular in horizontal cross section, each of said units being so constructed so as to be similar in size and shape to the bottom of one of said utensils, a framework extending between the walls of said member, said framework forming openings in such manner that as said utensils are placed in said operative position each utensil is thereby placed over a unit of a size and shape similar to that of the bottom of the utensil, each of said utensils being so constructed that the contour of the top edge of each is uneven so that a part of the said top edge is at a lower level than the balance of the said top edge when said utensil is in said operative position, an outwardly extending lip on each of said utensils at the said top edge which is at said lower level, the balance of the said top edge being at a higher level when said utensil is in said operative position so as to thereby force all boilovers and spillovers over said lip, means to receive said boilovers and spillovers when they are so forced over said lip.

References Cited in the file of this patent

UNITED STATES PATENTS

| 1,202,212 | Parker | Oct. 24, 1916 |
| 1,480,585 | Wilkie | Jan. 15, 1924 |
| 1,538,738 | Oldham | May 19, 1925 |
| 1,627,650 | Katzinger | May 10, 1927 |
| 1,690,570 | Dalbey | Nov. 6, 1928 |
| 1,823,540 | Guenther | Sept. 15, 1931 |
| 1,977,258 | Wilson | Oct. 16, 1934 |
| 2,154,491 | Chambers | Apr. 18, 1939 |
| 2,196,339 | Noe | Apr. 9, 1940 |
| 2,304,140 | Bergholm | Dec. 8, 1942 |
| 2,430,079 | Reeves | Nov. 4, 1947 |
| 2,544,153 | Hall | Mar. 6, 1951 |

FOREIGN PATENTS

| 213,185 | Germany | Sept. 14, 1909 |
| 56,312 | Switzerland | Dec. 4, 1911 |
| 84,583 | Switzerland | Mar. 16, 1920 |